(No Model.)
R. GOCHT.
IRON BEAM AND NAIL HOLDING DEVICE THEREOF.
No. 359,721. Patented Mar. 22, 1887.
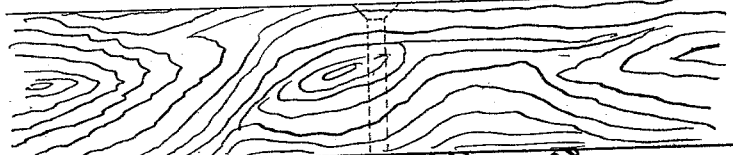
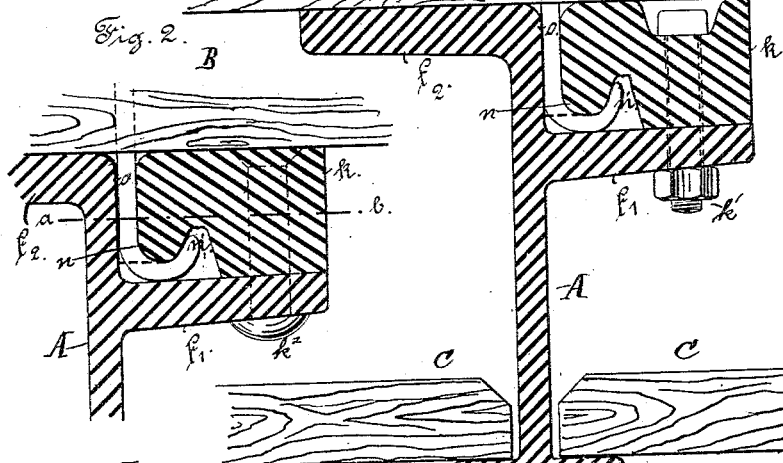
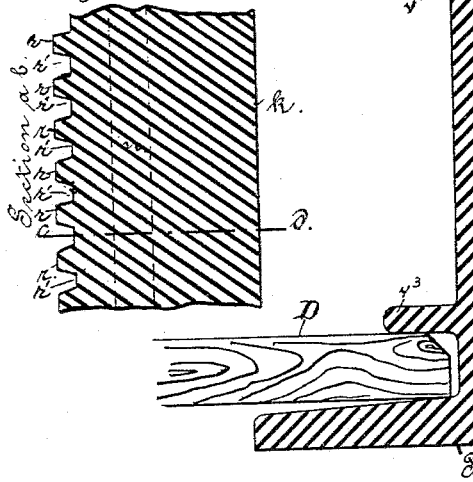
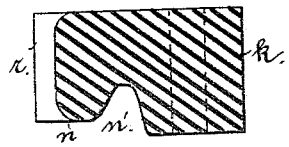
Witnesses:
W. R. Haight
A. Zichtl
Inventor:
Reinhold Gocht
by Wm H Babcock
Attorney.

UNITED STATES PATENT OFFICE.

REINHOLD GOCHT, OF ZITTAU, SAXONY, GERMANY, ASSIGNOR TO CARL FRIEDRICH FÜRCHTEGOTT STEUDTNER, OF SAME PLACE.

IRON BEAM AND NAIL-HOLDING DEVICE THEREOF.

SPECIFICATION forming part of Letters Patent No. 359,721, dated March 22, 1887.

Application filed August 26, 1886. Serial No. 211,929. (No model.)

*To all whom it may concern:*

Be it known that I, REINHOLD GOCHT, forage dealer, of Zittau, Saxony, a citizen of Germany, residing at Zittau, in the district of Oberlausitz and Kingdom of Saxony, have invented certain new and useful Improvements in the Manufacture of Iron Supporting-Beams with Preparation for Nails; and I do hereby declare the following to be a full, clear, and exact description of the invention, such as will enable others skilled in the art to which it appertains to make and use the same.

This invention relates to iron beams which are adapted to be used for supporting the wood-work of floors and ceilings.

The said invention consists chiefly in the combination of a beam flanged for the support of wood-work with a grooved guide-block, which, aided by said flanged beam, causes the nails to bend into the form of hooks after they have passed through the flooring or other wood-work, and prevents them from being withdrawn.

In the accompanying drawings, Figure 1 represents a vertical section through a flanged iron beam and guide-block embodying my invention, the wood-work resting on the flanges of said beam being also shown. Fig. 2 represents in detail the upper part of the beam sectioned as in Fig. 1, and the guide-block rivets being used instead of bolts for attaching these parts together. Fig. 3 represents a horizontal section through the guide-block only on the line $a\ b$, Fig. 2. Fig. 4 represents a vertical section on the line $c\ d$ of Fig. 3.

A designates the iron beam, which has approximately the shape of an I-beam, but, instead of a head exactly corresponding to its foot F, has a horizontal top flange, $f'$, on one side, considerably lower than the top flange, $f^2$, on the other side. The wood-work B of the flooring rests on this latter flange, while the space between said wood-work and flange $f'$ is occupied by a guide-block, $k$. This last is held rigidly to flange $f'$ by bolts or rivets, one of the former (marked $k'$) being shown in Fig. 1, while one of the latter (marked $k^2$) is shown in Fig. 2. The inner face of this guide-block is formed with alternating vertical ribs $r$ and grooves $r'$. This part of the block is also cut away, so as to leave a space between it and the flange $f'$. The material of said block at the bottom of the grooves is also rounded, as shown at $n$, and a high space or recess, $n'$, is formed behind it. In consequence of this shape of said block, whenever a nail, $o$, is driven through the flooring B into one of the grooves, $r'$, the flange $f'$ and the rounded and recessed inner part of the guide-block combine to bend said nail into a hooked form, as shown in Figs. 1 and 2, thus securely fastening the flooring to said block and the beam.

About midway of the beam flanges $v'\ v^2$ extend horizontally on opposite sides therefrom, and similar flanges, $v^3\ v^4$, are arranged just above the foot F. The former support the wood-work C, interposed between said flooring B and the ceiling of the story below. The ceiling-shell D of the latter is inserted on each side, between foot F and flanges $v^3\ v^4$.

I have mentioned the inner part of the guide-block $k$ as cut away; but this is merely intended as descriptive of its form.

The flanged beam and guide-block hereinbefore described obviate the necessity for wooden beams, and the inconveniences of fungus-growth and dry-rot are thus obviated. As compared with other metallic beams, the chief advantage is in the automatic, easy, and certain clinching of the nails.

Having thus described my invention, what I claim as new, and desire to secure by Letters Patent, is—

1. The flanged beam A, having a horizontal flange, $f'$, and a vertical part above it, in combination with bolt $o$ and the guide-block $k$, which is grooved on its inner face and provided with rounded parts $n$ and recess $n'$, said guide-block being bolted to said flange, substantially as and for the purpose set forth.

2. In combination with beam A, having on one side, at its top, the flange $f^2$ and on the other side, below its top, the flange $f'$, the guide-block $k$, fastened to the latter flange and having ribs $r$, alternating grooves $r'$, rounded part $n$, and recess $n'$, all substantially as and for the purpose set forth.

In testimony whereof I do affix my signature in presence of two witnesses.

REINHOLD GOCHT.

Witnesses:
   REINHOLD SEIDEL,
   CARL J. REICHELT.